United States Patent [19]

Dimon

[11] 3,842,362

[45] Oct. 15, 1974

[54] ADJUSTABLE PARALLEL-T NETWORK

[75] Inventor: Donald F. Dimon, Palatine, Ill.

[73] Assignee: The Hallicrafters Co., Rolling Meadows, Ill.

[22] Filed: Dec. 20, 1972

[21] Appl. No.: 316,906

[52] U.S. Cl. .................... 330/103, 330/85, 330/109

[51] Int. Cl. .................... H03f 1/36

[58] Field of Search ............ 330/85, 103, 107, 109; 331/142; 328/167

[56] References Cited

UNITED STATES PATENTS

| | | | |
|---|---|---|---|
| 2,441,567 | 5/1948 | Darlington | 330/109 X |
| 2,888,526 | 5/1959 | Stockman | 330/85 X |
| 3,356,962 | 12/1967 | Morgan | 330/107 X |
| 3,643,173 | 2/1972 | Whitten | 330/109 X |
| 3,715,678 | 2/1973 | Reichard | 330/107 X |

*Primary Examiner*—Herman Karl Saalbach
*Assistant Examiner*—James B. Mullins
*Attorney, Agent, or Firm*—Wegner, Stellman, McCord, Wiles & Wood

[57] ABSTRACT

A parallel-T network with a first adjustable means coupled to a twin-T network for independent adjustment of center frequency and a second adjustable means coupled to a branch in parallel with the twin-T network for independent adjustment of damping. The two adjustable means may comprise variable resistors and potentiometers, or amplifiers having a variable gain.

7 Claims, 3 Drawing Figures

ADJUSTABLE PARALLEL-T NETWORK

BACKGROUND OF THE INVENTION

This invention relates to parallel-T networks which provide separate and independent adjustment of center frequency and damping.

Various techniques have been devised to tune a twin-T network. For example, frequency adjustment for an oscillator incorporating a twin-T network in a feedback path has been provided by separate variable potentiometers which track in opposite directions, located in two branches of the twin-T. Other circuits are known in which a single potentiometer is used with a twin-T filter to provide frequency adjustment. Also known are twin-T networks having a third path for damping.

None of the known parallel-T networks have allowed independent control of both center frequency and damping. Furthermore, it would be desirable that any parallel-T network which provided both independent control of center frequency and damping should be of simple construction, and should not degrade the desirable properties of a twin-T type network.

SUMMARY OF THE INVENTION

In accordance with the present invention, a novel parallel-T network provides separate and independent control of center frequency and damping. This is accomplished by adding a third branch or path to a twin-T network, and by incorporating separate adjustable means for the twin-T network and for the third damping path. The applicant's network may be used for all applications to which the twin-T network is ordinarily applied, and has the further advantage of being tunable as to frequency and damping without upsetting the critical balance of the twin-T network.

One object of this invention is to provide an adjustable parallel-T network which allows separate and independent tuning of the center frequency and the damping of the network.

Another object of this invention is to provide an adjustable parallel-T network which allows less costly components in manufacture and permits very precise adjustments of center frequency and damping.

Other objects and features of the invention will be apparent from the following description, and from the drawings.

DESCRIPTION OF THE PREFERRED EMBODIMENTS

Figure 1:
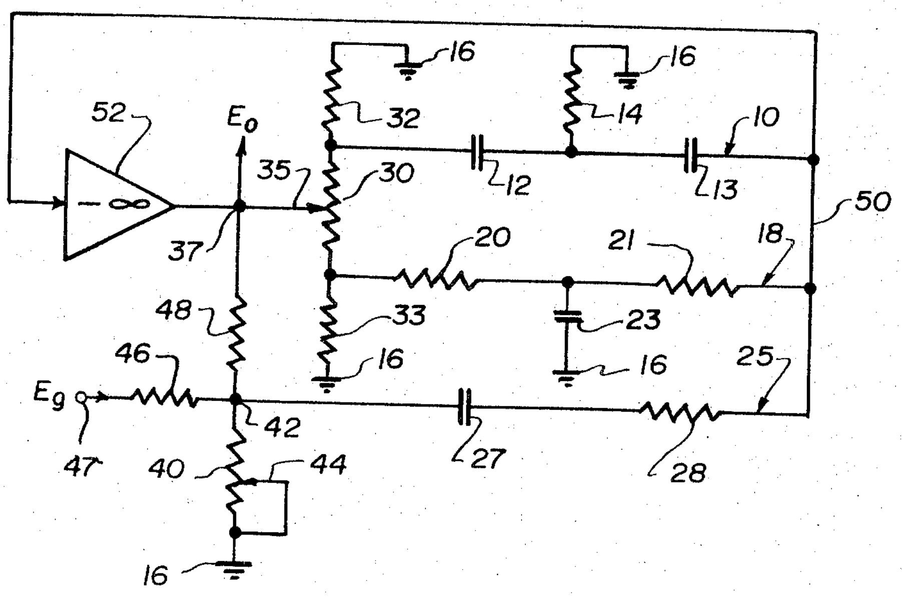
FIG. 1 is a schematic diagram of the applicant's parallel-T network as incorporated in an active bandpass filter.

In FIG. 1, an active bandpass filter is illustrated which incorporates the applicant's parallel-T network. A conventional twin-T network consists of a first path or branch 10 which includes a pair of reactive impedances such as capacitors 12 and 13 in series, and a resistor 14 connected in shunt between the intermediate junction of the pair of capacitors and a ground reference source 16. A second path or branch 18 includes in series a pair of resistive impedances, i.e., resistors 20 and 21, and a reactive impedance as capacitor 23 connected in shunt between the intermediate junction of the pair of resistors and ground 16. The twin-T network is shunted by a third path or branch 25 which includes a capacitor 27 and a resistor 28 connected in series.

A first adjustable means consists of a potentiometer 30 having one end of its fixed resistance connected to branch 10 and through a resistor 32 to ground 16, and its opposite end connected to branch 18 and through a resistor 33 to ground 16. A wiper 35 of potentiometer 30 is coupled to an output junction 37 at which an output voltage $E_o$ is available.

A second adjustable means consists of a potentiometer 40 connected as a variable resistor, that is, one end of its fixed resistance is connected to a junction 42 of the third branch 25. A wiper 44 of the potentiometer is directly coupled to the opposite end of its fixed resistance and to ground 16. A resistor 46 is connected in series between junction 42, and an input junction 47 at which an input voltage $E_g$ may be applied. A resistor 48 is connected between junction 37 and 42. All parallel branches 10, 18 and 25 are connected to a common summing line 50 which serves as an input for an operational amplifier 52 having a gain approaching negative infinity. The output of the operational amplifier 52 is coupled to junction 37.

Potentiometer 30 provides separate and independent control over the center frequency of the network, while potentiometer 40 provides separate and independent control over the damping or bandwidth of the network. This may be understood by the following analysis of the bandpass filter, in which the components forming the network may have, for example, the following values:

TABLE A

| Component | Value |
|---|---|
| Capacitor 12 | $C$ |
| Capacitor 13 | $C$ |
| Capacitor 23 | $2C$ |
| Capacitor 27 | $C/2Q_a$ |
| Resistor 14 | $R/2$ |
| Resistor 20 | $R$ |
| Resistor 21 | $R$ |
| Resistor 28 | $2Q_aR$ |

and where K represents the percentage adjustment of the potentiometer wiper 35 and N represents the percentage adjustment of the potentiometer wiper 44.

The currents I for the three branches 10, 18 and 25 are as follows:

$$I_{10} = (ARC^2P^2E_o)/K(2 + 2RCP) \quad (1)$$

$$I_{18} = AKE_o/R/(2 + 2RCP) \quad (2)$$

$$I_{25} = PC(E_o + E_g)A/2NQ_a(1 + RCP) \quad (3)$$

Where $P$ is used to denote the differential operator in time, $P = d/dt$. At the null point, line 50, the currents given above sum to zero:

$$\Sigma I = RCPE_o/K + E_o/NQ_a + KE_o/RCP + E_g/NQ_a = 0$$

(4)

Equation (4) above represents in operator form, a linear constant coefficient integro-differential equation in the variable $E_o$, of a form, $$PE_o/\omega_o + E_o/Q + \omega_o E_o/P = BE_g/Q \quad (5)$$

which is well known in the electrical arts to be the equation for resonance, where $\omega_o$ is the angular frequency of resonance, and $Q$ is the quality factor or degree of resonance. $Q$ is also well known to be inversely related to damping; the higher the $Q$, the less the damping, and vice versa. Equations (4) and (5) are identical, provided that $$\omega_o = K/RC \quad (6)$$

$$Q = NQ_a \quad (7)$$

$$B = -1 \quad (8)$$

The solution of Equation (5) is easily found by LaPlace transformation or other well known means to yield, where $j = \sqrt{-1}$, the following relationships:

$$E_o = B/Q\ E_g/[j/\omega_o + 1/Q + \omega_o/j] \quad (9)$$

or, $$E_o = BE_g/1+jQ\ [1/\omega_o - \omega_o] \quad (10)$$

From Equations (6) and (7), it can be seen that the center frequency $\omega_o$ is directly proportional to the setting of potentiometer 30, and is independent of the setting of potentiometer 40. Similarly, the damping or $Q$ of the network is proportional to the setting of potentiometer 40 and is independent of the setting of potentiometer 30 as well as the gain of amplifier 52. It should also be noted from Equation (10) that an increase in the $Q$ does not increase the gain of the bandpass filter at resonance.

Figure 2:
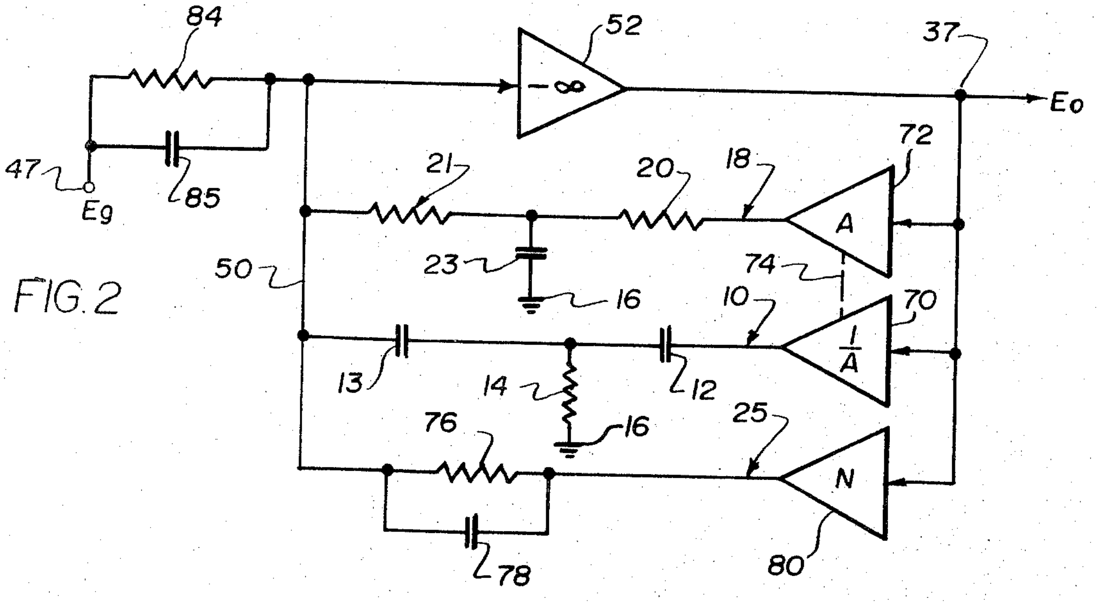
FIG. 2 is a schematic diagram of another embodiment of applicant's parallel-T network as incorporated in a bandpass filter.

In FIG. 2, a different embodiment of the adjustable parallel-T network is illustrated, as incorporated in an active bandpass filter. Elements corresponding to the elements of FIG. 1 have been identified with the same reference numeral. The center frequency adjustment consists of an amplifier 70 in branch 10 and an amplifier 72 in branch 18, which have gains of $1/A$ and $A$, respectively. The pair of amplifiers 70 and 72 are coupled together through gain tracking means 74 so that their gains track in equal and opposite directions. Any known circuit which gives outputs of $A$ and $1/A$ can be used to form the amplifier 70 and 72. As the gain of the pair of tracked amplifiers is varied, the center frequency of the network is varied in a manner similar to the action produced by movement of wiper 35 of FIG. 1.

The third damping branch 25 includes a resistor 76 in parallel with a capacitor 78. The adjustment means consists of a series connected amplifier 80 having a variable gain N. Adjustment of the gain N varies the damping of the network, in a manner similar to the operation produced by movement of wiper 44 of FIG. 1. The input terminal 47 of the network is coupled to the input of amplifier 52 through a resistor 84 and a capacitor 85 connected in parallel.

The operation of the circuit of FIG. 2 may be understood by the following equations, in which the components forming the network are assumed to have the following exemplary values:

TABLE B

| Component | Value |
|---|---|
| Capacitor 12 | $C$ |
| Capacitor 13 | $C$ |
| Capacitor 23 | $2C$ |
| Capacitor 78 | $C/4Q_b$ |
| Capacitor 85 | $C/2$ |
| Resistor 14 | $R/2$ |
| Resistor 20 | $R$ |
| Resistor 21 | $R$ |
| Resistor 76 | $4Q_bR$ |
| Resistor 84 | $2R$ |

The currents $I$ for the three branches 10, 18 and 25 and for the input branch ($g$) are as follows:

$$I_{10} = P^2\tau^2E_o/2A\ (1 + \tau P)R \quad (11)$$

$$I_{18} = AE_o/2R\ (1 + \tau P) \quad (12)$$

$$I_{25} = (1 + \tau P)\ (NE_o/4Q_b) \quad (13)$$

$$I_g = (1 + \tau P)\ (E_g/2) \quad (14)$$

At the null point, line 50, the currents given above sum to zero:

$$\Sigma I = I_{10} + I_{18} + I_{25} - I_g = 0 \quad (15)$$

$$P^2\tau^2E_o/A + [2(1 + \tau P)\ (1 + \tau P)NE_o]/A\ 4\ Q_b + E_o = (1 + \tau P)^2E_g/A \quad (16)$$

which near resonance can be simplified to:

$$[P\ \tau/A\ (1 + AW/2Q_b) + N/Q_b + A/P\tau]E_o \cong 2E_g \quad (17)$$

hence Equation (17) illustrates that only second order interrelationships exist between frequency and degree of resonance and that, $$\omega_o \cong A/\tau \quad (18)$$

$$Q \cong Q_b/N \quad (19)$$

As can be seen from Equations (18) and (19), the center frequency approaches and follows the gain A of the pair of tracked amplifiers 70 and 72. The damping Q approaches and follows the inverse of the gain N of amplifier 80. Thus both the center frequency adjustment and the bandwidth adjustment are separate and independent from each other. In this embodiment it is to be noted that gain at resonance will be proportional to Q.

Figure 3:
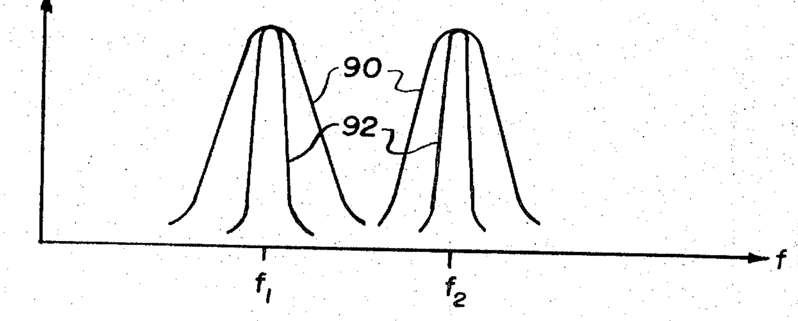
FIG. 3 is several selectivity curves showing the independent adjustment of center frequency and bandwidth for the active bandpass filter of FIG. 1, and the active bandpass filter of FIG. 2 (except that gain at resonance will be proportional to $Q$).

In FIG. 3, selectivity curves for the active bandpass filter of FIG. 1, and the active bandpass filter of FIG. 2 (except that gain at resonance will be proportional to $Q$) are illustrated. Adjustment of the center frequency control (wiper 35 of FIG. 1 or gain A of FIG. 2) shifts the center frequency of the network as from $f_1$ to $f_2$. For a particular setting of the damping or $Q$ control (wiper 44 of FIG. 1 or gain $N$ of FIG. 2) a particular bandwidth 90 can be established. For a different setting, a different bandwidth 92 can be established. The bandwidths 90 and 92 are controllable independent of the center frequency f to which the bandpass filter is set.

The adjustment features hereof permit construction with included components whose electrical values may vary greatly from those ordinarily required to produce a sharp notch at an exact frequency. Thus, great savings are obtained when the invention is employed in place of conventional precision parallel-T networks.

It is to be understood that the component values given above in tables A and B are exemplary only; and that other values may be employed together with damping elements corresponding thereto in value and time constant, to produce a transmission notch at a prescribed frequency of applied signals.

It is well known that when a twin-T network is incorporated in a negative feedback loop of an active filter, and the resistance value of the shunt resistor is lowered from the value chosen for the notch characteristic, a slight phase shift occurs and oscillation will begin. The adjustable features hereof, when used in conjunction with such an amplification apparatus as illustrated for example in FIGS. 1 and 2, and when incorporating a reduced resistance value for shunt resistor 14, permit smooth control of oscillations of very low distortion over a range of frequencies.

While parallel-T networks have been illustrated in connection with an active bandpass filter, it will be understood that these networks can be incorporated generally for any application to which the twin-T network is applicable. It is to be noted that the structure of the damping path may be varied greatly from the illustrative embodiments with only minor changes in the operation hereof, and that all such variations are included within the scope of the invention.

I claim:

1. An active bandpass filter with an adjustable parallel-T network, comprising:
- a high gain amplifier having an amplifier input, and an amplifier output which corresponds to the output of the bandpass filter;
- a reference source of potential fixed with respect to signals at said amplifier input and amplifier output;
- feedback means connected in shunt between said amplifier input and said amplifier output including a first branch having two resistive means in series and a capacitive means connected in shunt to said reference source, a second branch having two capacitive means in series and a resistive means connected in shunt to said reference source, a third branch including resistive means and capacitive means, center frequency adjustment means connected with said first and second branches and having an element variable to adjust the center frequency of said bandpass filter, damping adjustment means connected with said third branch and having an element variable to adjust the bandpass of said bandpass filter;
- an input terminal for signals to be coupled to the filter;
- first impedance means for connecting said input terminal to a junction between said damping adjustment means and said third branch; and
- second impedance means coupling said junction to said amplifier output of said high gain amplifier.

2. The active bandpass filter of claim 1 wherein said damping adjustment means comprises a variable impedance located between said junction and said reference source.

3. The active bandpass filter of claim 1 wherein said first impedance means comprises a first resistance for DC coupling said input terminal to said junction, and said second impedance means comprises a second resistance for DC coupling said junction to said amplifier output.

4. An active bandpass filter with a variable bandpass and a constant gain at a variable center frequency, comprising:
- a high gain amplifier having an amplifier input and an amplifier output;
- a first branch having two impedances in series and a third impedance connected to the junction of the series impedances;
- a second branch having two impedances in series and a third impedance connected to the junction of the series impedances;
- a third branch including a reactive impedance;
- an input terminal for signals to be coupled to the filter; and
- feedback means connecting said first branch, said second branch and said third branch between said amplifier input and said amplifier output and including center frequency adjustment means having an element variable to adjust the center frequency of said bandpass filter, damping adjustment means having an element variable to adjust the bandpass of said bandpass filter, and impedance means connected between the input terminal and the amplifier output and separate from the variable elements to maintain constant the gain of said bandpass filter at said adjustable center frequency.

5. The active bandpass filter of claim 4 wherein said feedback means connects one end of said third branch directly to said amplifier input and the other end of said third branch directly to said damping adjustment means, and the impedance means includes a resistance for connecting said input terminal to said damping adjustment means.

6. The active bandpass filter of claim 4 wherein the impedance means comprises a first resistance for connecting said input terminal to said damping adjustment means and a second resistance for coupling said damping adjustment means to said amplifier output, the first and second resistances defining a fixed resistance path between the input terminal and the amplifier output.

7. The active bandpass filter of claim 6 wherein said damping adjustment means comprises a variable resistor having an element variable to adjust the resistance thereof, a reference source of potential fixed with respect to signals at said amplifier input and said amplifier output, means connecting said variable resistor between said reference source and a junction between said first resistance and said second resistance, said junction being coupled to said third branch.

* * * * *